Feb. 12, 1946.  E. M. HAWKINS  2,394,610
APPARATUS FOR MANUFACTURING OPTICAL PRISMS
Filed June 30, 1943
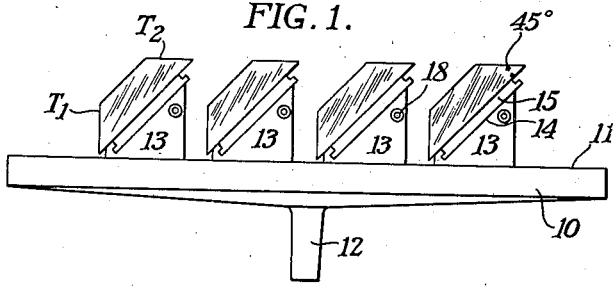
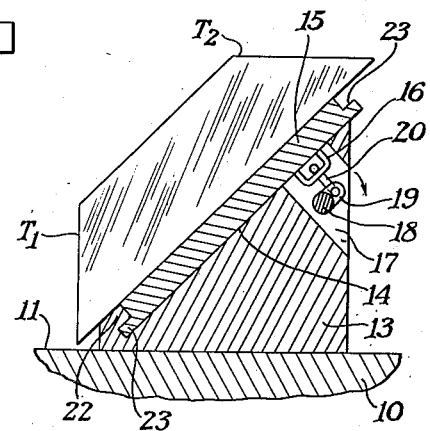
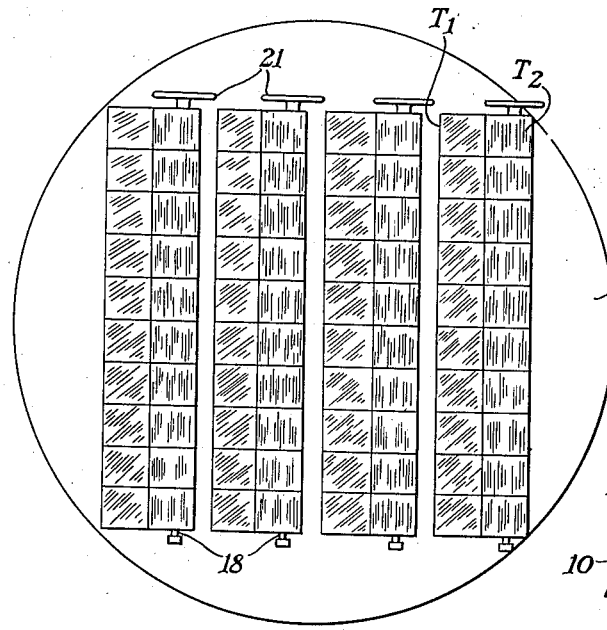
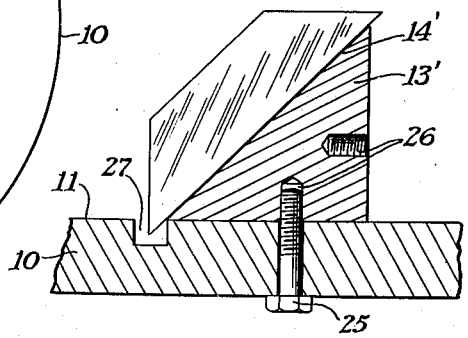
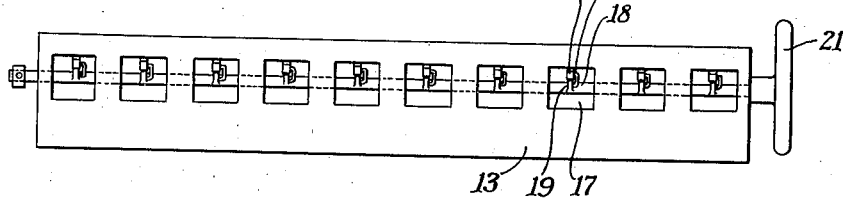
EDGAR M. HAWKINS
*INVENTOR*
BY
*ATTORNEYS*

Patented Feb. 12, 1946

2,394,610

UNITED STATES PATENT OFFICE 2,394,610

APPARATUS FOR MANUFACTURING OPTICAL PRISMS

Edgar M. Hawkins, Rochester, N. Y., assignor to Eastman Kodak Company, Rochester, N. Y., a corporation of New Jersey Application June 30, 1943, Serial No. 492,891

5 Claims. (Cl. 51—216)

The present invention relates to the manufacture of optical prisms, and particularly to an apparatus for blocking prisms for the grinding and polishing of the surfaces thereof which holds pyramid angle in the prism to a minimum and causes the generation of accurate angles.

Since the present blocking apparatus is particularly useful in the manufacture of dove prisms, it will be described in connection with the manufacture thereof. However, it will be obvious to those skilled in the art, after reading the present disclosure, that the usefulness of the apparatus is not limited to the manufacture of this particular type of prism, and, accordingly, applicant has no intention of limiting the present invention to such an extent.

As is well known, in the dove prism the light strikes one transmission surface of the prism at 45° and is refracted toward the hypotenuse. The hypotenuse totally reflects the light to the second transmission surface where it is refracted and leaves at 45° to that surface. The deviation is usually zero but may be varied by tipping the prism, and the image is inverted. One application of such a prism is in a panoramic sight to keep the image right side up. The prism can be tilted to adjust the deviation to zero in one direction, but the deviation in the other direction is a function of pyramid angle and cannot be corrected in mounting. In addition, in some applications, it is important that the two base angles of the dove prism be kept accurately equal. Pyramid angle in a prism depends upon how accurately the edges of the prism are parallel to one another, and a prism in which the edges are accurately parallel will have no pyramid angle.

It is common practice to mount dove prisms in V-blocks to grind and polish the respective surfaces, or to grind and polish them by hand to generate accurate base angles. Both of these procedures possess draw backs which the present invention is designed to overcome, and which draw backs are well known to those skilled in the art, and will be readily apparent to those less skilled in the art after reading the following description of the present invention.

The primary object of the present invention is the provision of a device for blocking optical prisms, and by the use of which two or more angularly related surfaces of a prism may be ground and polished by machine to obtain accurate angles between the surfaces.

Another object is the provision of a blocking device which holds pyramid angle in a prism to a minimum.

And a further object is the provision of a blocking device of the type set forth the use of which permits machine grinding and polishing of the transmission surfaces of a dove prism in a manner to hold pyramid angle in the prism to a minimum and produce base angles accurately equal.

And yet another object is the provision of a blocking device of the type set forth which appreciably steps up the speed of production of prisms, and eliminates the necessity of skilled operators for the reason that hand correction is entirely, or substantially, eliminated.

The novel features that I consider characteristic of my invention are set forth with particularity in the appended claims. The invention, itself, however, both as to its organization and its methods of operation, together with additional objects and advantages thereof, will best be understood from the following description of specific embodiments when read in connection with the accompanying drawing in which:

Fig. 1 is a side elevation of a blocking device constructed in accordance with the present invention with a plurality of dove prisms blocked thereby, Fig. 2 is a top plan view of the device shown in Fig. 1, Fig. 3 is an enlarged vertical section of a part of the blocking device, and showing one means of releasably clamping the prism supporting plates to the rigid prism supports, Fig. 4 is an elevational view of the rear side of the rigid supporting blocks, and showing how the clamping means for an elongated plate supporting a stick of prisms is operated, and Fig. 5 is a vertical sectional view showing a second embodiment of the present invention.

Like reference characters refer to corresponding parts throughout the drawing.

Generally, the present invention comprises employing plano-parallel plates upon which one or more prisms are mounted, as an auxiliary device, for locating and supporting the prism surfaces to be ground and polished in such a manner as to generate accurate prism angles and true prism surfaces with parallel edges, and hence, negligible pyramid error.

Referring now to the drawing, the blocking device according to a preferred embodiment of the present invention comprises a table 10 having a plano top surface 11. Extending vertically from the bottom of the table is a spindle 12 which is adapted to connect the table to any suitable form of rotating or oscillating mechanism, not shown, so that the top surface will be constantly parallel relative to the grinding and polishing plane. The grinding and polishing plane, as is well known, will be defined by the plane of movement of tools adapted to be brought down onto the work from above the table 10.

Supported on the top of the table 10 are one or more rigid prism supports 13 having an inclined plano-supporting face 14 making an angle with the top of the table equal to the angle to be generated in the prism. In the present instance, the device is shown as designed for grinding the base angles of a dove prism which are 45° angles, and accordingly, the inclined supporting face is 45° to the top surface of the table.

Dove prisms are prepared for this device by first grinding and polishing the hypotenuse surface thereof as a preliminary step. The prism blanks, after having their ends plano-ground and joined into sticks, or individually, are then mounted on plano-parallel plates 15 with their finished hypotenuse face in surface contact with one surface of the plate, with the transmission surfaces $T_1$ and $T_2$ thereof to be finished extending beyond the ends of the plate. The prism blanks may be cemented to the surface of the plano-parallel plate 15 by the use of a suitable adhesive, such as Canada balsam.

The plano-parallel plate 15 after having a prism blank mounted on one surface thereof, is mounted on the rigid support 13 with its other plano-surface in surface contact with the plano-inclined supporting surface 14. The means for mounting the parallel plates on the support 13 may take a number of forms, but for purposes of illustration, I have shown one surface of the plate provided with a plurality of spaced stirrups 16 which are adapted to extend into recesses 17 in the support 13 when the plate is mounted on the inclined supporting surface 14, see Figs. 3 and 4. A shaft 18 extends through the support 13, in alignment with the recesses 17, and is rotatably mounted in the support. Fixed to those portions of the shaft extending through the recesses 17 is a crank 19 to the end of which is pivoted a hook 20 adapted to engage the stirrups 16 to pull the plano-parallel plate down onto the inclined surface 14.

To engage and disengage the hooks with the stirrups 16 the shaft 18 is free to move longitudinally by a limited extent when the wheel 21 on the end thereof is pulled upon. By turning the wheel 21, all of the hooks 20 along the length of the plate 15 may be caused to pull the plate down onto the inclined surface 14 or release the same, depending, of course, upon the direction of rotation of the wheel. The lower end of each plano-parallel plate may be held against the inclined surface by virtue of the engagement between a hooked nose 22 on the lower end of the support 13 and a cut-out 23 in the end of the end of the plano-parallel plate. Looking at Fig. 1, when the plano-parallel plate is mounted on the inclined supporting surface 14 in the position shown, the transmission surface $T_2$ of the prism will be ground and polished parallel to the top of the table and the base angle formed between this surface and the hypotenuse will be accurately 45°, or equal to the angle between the inclined surface 14 and the top of the table.

After the exposed surfaces $T_2$ of the prisms are ground and polished parallel to the plano top of the table, the plano-parallel bars are removed from the inclined surface 14 and are then reversed end for end and placed back thereon for the finishing of the other transmission surface $T_1$. The same inclined surface 14 is used for supporting the respective plano plates 15 in the two positions so that any error in the fixture will cancel out. It will be appreciated that by means of this device, the base angles of the dove prism will be accurately equal to each other and to the angle between the inclined surface 14 and the plano top of the table, and the edges of the prism formed by the intersection of the transmission surfaces and the hypotenuse of the prism will be accurately parallel so that pyramid error will be held to a minimum.

The same result can be obtained in a slightly different manner which will now be set forth. Instead of having the prism attached to a plano-parallel plate which is in turn detachably connected to the inclined surface 14 of the rigid supporting block 13, as in the preferred embodiment, the finished hypotenuse of the prism blank is directly cemented to the inclined surface 14' of the supporting bar 13', as shown in Fig. 5, or the prism is cemented to a plano-parallel plate as before and the plate is attached to the inclined surface 14'. The rigid supporting bar 13' in this instance is separate from the table and is adapted to be mounted thereon, with either one of its short sides in surface contact with the plano top thereof, by means of bolts 25 extending through the table and into tapped openings 26 in the sides of the block.

If the device is to be used for finishing the transmission surfaces of a dove prism having 45° base angles, the supporting bar should have a cross section in the form of an isosceles right triangle as shown, and the two short sides thereof should be accurately plano to cooperate with the plano top of the table. The prism blank is cemented to the inclined surface 14' of the supporting bar 13' with its finished hypotenuse in surface contact therewith and with its ends extending beyond the corners of the bar to be accessible to the grinding plane. To permit the bar to be fixed to the top of the table in surface contact therewith, the top of the table is provided with a cut-out 27 to receive the over hanging edge of the prism blank, see Fig. 5. The bar 13' is attached to the table with one short side thereof in surface contact with the table for the finishing of one transmission surface thereof. After the first transmission surface is finished parallel to the top of the table, the bar 13' is removed, turned end for end and through 90°, and is reattached to the table with the other short side thereof in surface contact with the top of the table. This brings the second transmission surface of the prism in position for grinding and polishing. It is essential to obtaining accurate base angles in the prism, and parallel prism edges, that the short sides of the supporting bar be accurately plano, and that the bar be truly an isosceles right triangle in cross section.

By the use of the present prism blocking apparatus, the generation of given angles in prisms is accurately controlled by the angles of the supporting block and/or the angle between the inclined supporting surface of the block and the plano-surface of the table. At the same time it is assured that the edges of the prism will be mutually parallel, or nearly so within the limits of accuracy of the device, so that pyramid angle in the prism is held to a minimum. I have found that the pyramid error can be held to within 15 seconds of arc with this device, and which error is practically zero. By means of this device, the manufacture of prisms is greatly speeded up because all hand operations, including hand corrections, is entirely eliminated, or reduced to a minimum. The use of this blocking device reduces the manufacturing procedure of prisms to a routine which can be performed by unskilled labor, and as the result of which the manufacturing cost is reduced.

Although I have shown and described certain specific embodiments of my invention, I am fully aware that many modifications thereof are possible. My invention, therefore, is not to be limited to the precise details of construction shown and described but is intended to cover all modifications coming within the scope of the appended claims.

Having thus described my invention, what I claim as new and desire to secure by Letters Patent of the United States is:

1. Apparatus for grinding and polishing two angularly related surfaces of a prism to obtain a given angle between the surfaces and two equal base angles formed by the intersection of each of said surfaces with a third surface, and comprising, in combination, a movable table having a plano-supporting surface which is constantly parallel to the grinding plane, a rigid support on the plano-surface of said table including a plano-locating surface inclined to the surface of said table at an angle equal to the base angle desired in the prism, a plano-parallel plate on one surface of which the prism, after having its third surface finished, is adapted to be located with said third surface in surface contact therewith, means for releasably mounting said prism on said plate, and means for releasably attaching said plate to said rigid support with its other surface in contact with the inclined surface of said support, whereby one of the two surfaces of the prism to be finished is located relative to the grinding plane in such a way that when finished it will be parallel to the plano-surface of the table.

2. Apparatus for grinding and polishing two angularly related surfaces of a prism to obtain a given angle between the surfaces and two equal base angles formed by the intersection of each of said surfaces with a third surface, and comprising, in combination, a movable table having a plano-supporting surface which is constantly parallel to the grinding plane, a rigid support on the plano-surface of said table including a plano-locating surface inclined to the surface of said table at an angle equal to the base angle desired in the prism, a plano-parallel plate in surface contact with one surface of which the third surface of the prism, after being finished, is adapted to be cemented, means for detachably mounting said plate to said rigid support with its other surface in contact with the inclined surface of said support, whereby one of the two surfaces of the prism to be finished is located relative to the grinding plane in such a way that when finished it will be parallel to the plano-surface of the table.

3. Apparatus for grinding and polishing two angularly related surfaces of a prism to obtain a given angle between the surfaces and two equal base angles formed by the intersection of each of said surfaces with a third surface, and comprising, in combination, a movable table having a plano-supporting surface which is constantly parallel to the grinding plane, a support having two plano-locating sides intersecting at an angle equal to the angle desired between the two surfaces of the prism, and having a third side inclined relative to one of said locating sides at an angle equal to the required base angle of the prism, means for detachably mounting said support on the table with one of the locating sides thereof in contact with the plano-surface of the table, a plano-parallel plate on one surface of which a prism, having a third surface finished, is adapted to be located with said third surface in surface contact therewith, and means for detachably connecting said plate to said support with its other surface in contact with the inclined surface of said support, whereby one of the two surfaces of the prism to be finished is located relative to the grinding plane in such a way that when finished it will be parallel to the plano-surface of the table.

4. Apparatus for grinding and polishing the two transmission surfaces of a dove prism the hypotenuse surface of which has been previously ground and polished, and comprising, in combination, a movable table having a plano-top surface which is constantly parallel to the grinding plane, a right angle wedge-shaped support, having base angles equal to the base angles desired in the prism, on the top surface of the table with one short side extending at right angles thereto and with the other short side in surface contact therewith, a plano-parallel plate on one face of which the prism is adapted to be mounted with its hypotenuse in surface contact with one face of the plate, and means for detachably mounting the plate with its other face in surface contact with the hypotenuse surface of the support, whereby one of the transmission surfaces of the prism is located relative to the grinding plane in such a way that when finished it will be parallel to the plano-surface of the table.

5. Apparatus for grinding and polishing the two transmission surfaces of a dove prism the hypotenuse surface of which has been previously ground and polished, and comprising, in combination, a movable table having a plano-top surface which is constantly parallel to the grinding plane, a right triangular support having base angles equal to the base angles desired in the prism, a plano-parallel plate on one face of which the prism is adapted to be cemented with its hypotenuse in surface contact with one face of the plate, means for detachably mounting the plate with its other surface in contact with the hypotenuse surface of the support, and means for detachably mounting the support on the top of the table with either one of the short sides thereof in surface contact with the plano-surface of the table, whereby each of the transmission surfaces of the prism is in turn located relative to the grinding plane in such a way that when finished they will be plano, at right angles to one another, and their edges will be parallel.

EDGAR M. HAWKINS.